(12) United States Patent
Hidaka

(10) Patent No.: US 6,344,900 B1
(45) Date of Patent: *Feb. 5, 2002

(54) IMAGE PROCESSING APPARATUS, METHOD AND RECORDING SYSTEM FOR PROVIDING COLOR MATCHING BETWEEN A LIGHT SOURCE AND A MATERIAL COLOR

(75) Inventor: Yumiko Hidaka, Inagi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/724,463

(22) Filed: Oct. 1, 1996

(30) Foreign Application Priority Data

Oct. 2, 1995 (JP) ............................... 7-255402
Sep. 17, 1996 (JP) ............................... 8-244845

(51) Int. Cl.$^7$ ................................. B41B 1/00
(52) U.S. Cl. ................ 358/1.9; 358/518; 382/167
(58) Field of Search .................. 345/153, 154, 345/431, 150, 155; 348/223, 179; 382/167, 162; 356/405, 402; 358/518, 520, 1.9, 1.1, 500, 501, 507, 516, 519, 523; 386/17

(56) References Cited

U.S. PATENT DOCUMENTS

| | | | | | |
|---|---|---|---|---|---|
| 4,379,292 A | * | 4/1983 | Minato et al. | ............... | 345/154 |
| 4,773,761 A | * | 9/1988 | Sugiyama et al. | ........... | 356/405 |
| 5,157,464 A | * | 10/1992 | Laihanen | ..................... | 356/402 |
| 5,254,978 A | * | 10/1993 | Beretta | ........................ | 345/150 |
| 5,363,197 A | * | 11/1994 | Ohno et al. | ................. | 356/405 |

FOREIGN PATENT DOCUMENTS

JP  07258631 A  10/1995

\* cited by examiner

*Primary Examiner*—Dov Popovici
(74) *Attorney, Agent, or Firm*—Fitzpatrick, Cella, Harper & Scinto

(57) ABSTRACT

An image processing method whereby when a display of a light source color to display a visible image by a color generation and a display of a material color to display a visible image by depositing a coloring agent onto a material to be recorded are color matched, a luminance component of the material color display is corrected so as to be larger than the luminance component of the light source color display. The correction of the luminance component is executed after converting into color space signals which don't depend on characteristic of the visible image display apparatus to be used. The luminance component is raised in the conversion from an input signal of the light source color display into an output signal of the material color display and the luminance component is reduced in the conversion from an input signal of the material color display into an output signal of the light source color display.

7 Claims, 9 Drawing Sheets

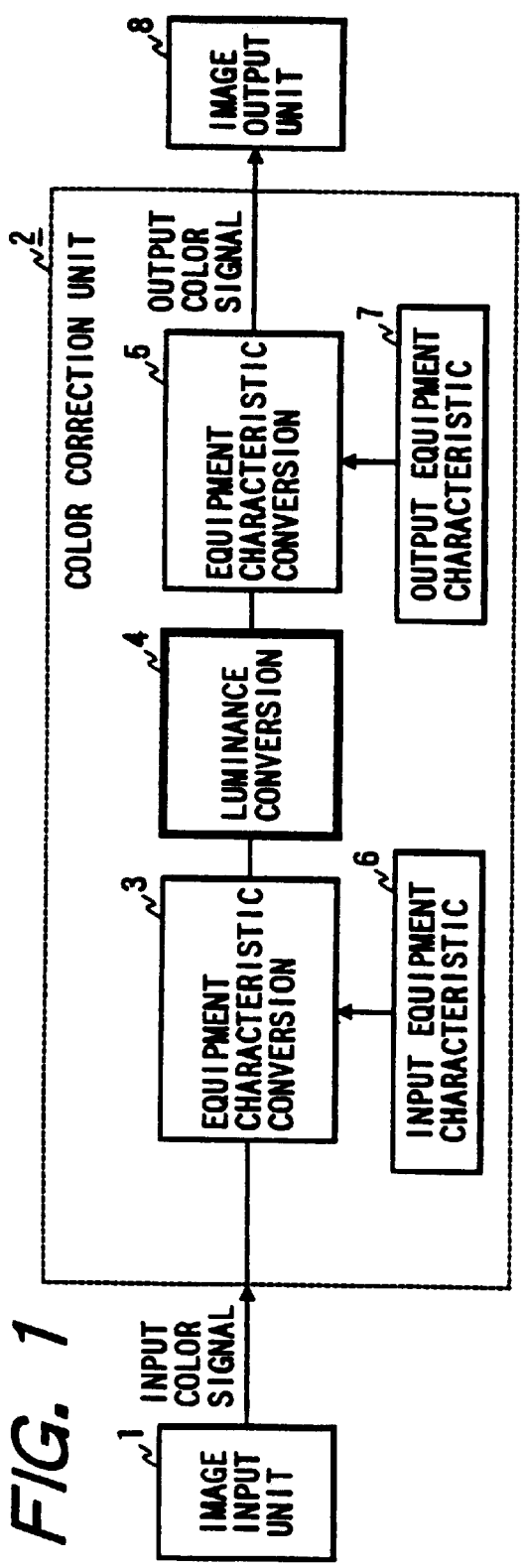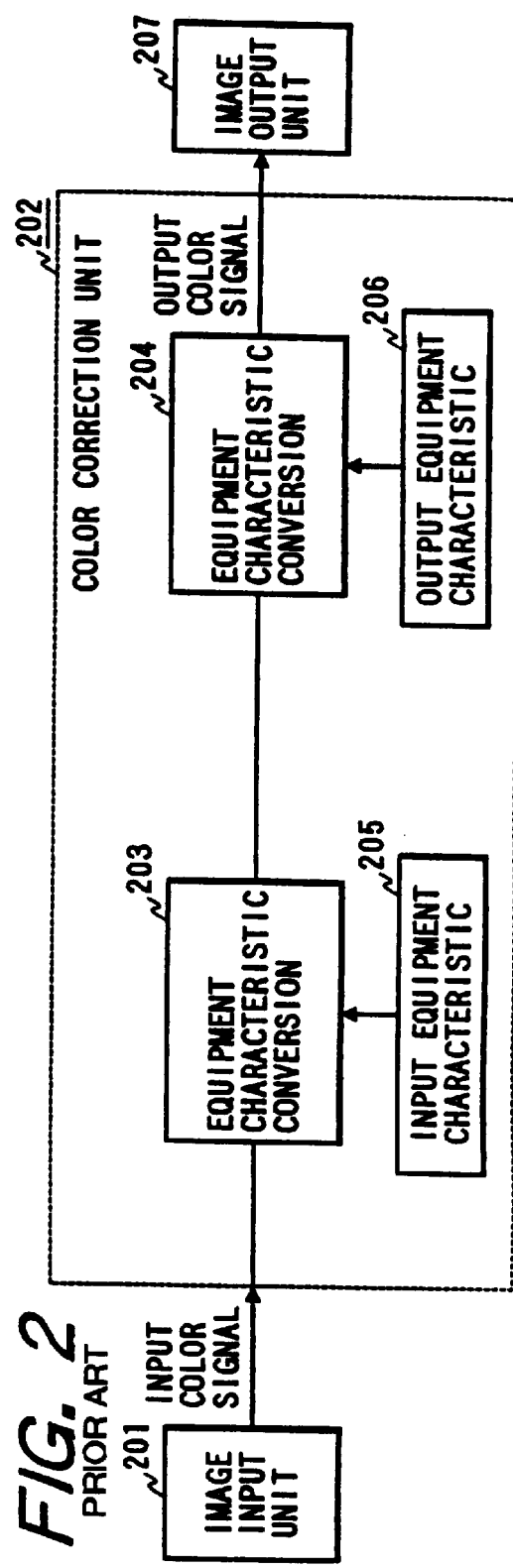

IMAGE PROCESSING APPARATUS, METHOD AND RECORDING SYSTEM FOR PROVIDING COLOR MATCHING BETWEEN A LIGHT SOURCE AND A MATERIAL COLOR

BACKGROUND OF THE INVENTION

1. Field of the Invention

The invention relates to image processing apparatus and method and recording medium for realizing a color matching between a light source color and a material color.

2. Related Background Art

FIG. 2 shows a prior art of an image signal processing apparatus for performing a signal conversion between a signal of a light source color and a signal of a material color (body color). The light source color is a color of a light which is emitted from a light source. The material color is a color of a material which reflects or transmits the light. In the apparatus, input color signals obtained from an image input unit 201 are corrected by a color correction unit 202 and the correction data is sent to an image output unit 207. A signal conversion is performed by an equipment characteristic conversion circuit 203 by using the signal from the image input unit 201 and an input equipment characteristic read out from an ROM 205. The corrected signals are further converted into output color signals by using an output equipment characteristic read out from an ROM 206.

As mentioned above, in the conventional color correction unit, when the material color and the light source color are matched, no correction is performed with respect to a luminance component of the material color.

However, when the human being recognizes the light source color and th material color as a same color, if each color tag is actually measured by a method according to the JIS, luminance values of both of those colors are fairly different. Therefore, there is a problem such that the light source color and the material color are seen as different colors when the conventional color signal correcting method is merely used for the data conversion between the light source color and the material color.

As a method of color matching even when color modes are different, the applicant of the present invention has proposed, for example, a method of calculating white as a reference of a perception of the human being on the basis of an observation light source and a ratio adapted to a monitor and converting an image on the basis of such calculated white as a reference or the like.

As shown in FIG. 3, a chromaticity value of white serving as such a perception reference is calculated from the observation light source, a chromaticity (for example, CIEx,y chromaticity value) indicative of a color tone of white of the monitor, and an adaptation ratio. On the other hand, as a luminance value, a value calculated by a color matching experiment, a proper value obtained by a simple preparatory experiment, or a value that is equivalent to the luminance obtained by a color measurement is used.

The applicant of the present invention also has already proposed a method whereby when a luminance value of a light source by which a printed matter is seen is very brighter than a display limit luminance of a monitor, an image is displayed on the monitor by using a value lower than the luminance data derived by measuring the printed matter, thereby matching both colors.

Even when the color modes differ, in order to enable both colors to be seen as a matched color, it is necessary for the human being to clarify the relation between both of the color tones and brightness senses of both colors to be matched.

As mentioned above, however, although the relation has been clarified with respect to the chromaticity values, as for the luminance, a value obtained by a color matching experiment is used or the like and the relation about the luminance is not yet clarified. As mentioned above, the value calculated from the color matching experiment can be applied in only a certain limited environment. When the human being wants to observe in an environment different from the environment in which the experiment was performed, parameters have to be obtained by executing color matching experiments or the like, so that there is still room for improvement about a drawback such that a generality extremely lacks.

Further, it is known that when the luminance of the printed matter is very higher than that of the monitor as mentioned in the proposed technique, the color matching can be performed by outputting a value lower than the luminance of the printed matter to the monitor. However, the relation about to which extent the luminance is reduced when the luminance of the printed matter has what degree of value is not yet clarified. Further, when the luminance of the printed matter is lower than the luminance of the monitor, whether such a relation is held or not cannot be known.

As mentioned above, in case of performing a color matching even when the color modes of the light source color and the material color are different, the relation of the luminance when the light source color and the material color are matched is hardly clarified yet.

SUMMARY OF THE INVENTION

It is an object of the invention to highly accurately realize a color matching between a light source color and a material color.

To accomplish the above object, according to the invention, there is provided an image processing method whereby when a display of a light source color to display a visible image by a color generation and a display of a material color to display a visible image by depositing a coloring agent onto a material to be recorded are color matched, a luminance component of the material color display is corrected so as to be larger than the luminance component of the light source color display.

To accomplish the above object, according to the invention, there is also provided an image processing apparatus for matching display colors in both of a display apparatus of a light source color to display a visible image by performing a color generation and a display apparatus of a material color to display a visible image by depositing a coloring agent onto a material to be recorded by using those display apparatuses, wherein the image processing apparatus has correcting means for correcting the luminance component of the display image by the material color display apparatus so as to be larger than the luminance component of the display image by the light source color display apparatus.

Another object of the invention is to provide image processing method and apparatus such that when a color matching between colors of input and output images is performed, on the basis of information regarding a light source in a display apparatus, a deviation of colors to be seen which is caused due to the relation between the light source and the display apparatus is corrected, and in order to correct a deviation of the colors to be seen which is caused due to a difference of the color temperatures between the light sources of the input and output images, such a deviation can be corrected on the basis of information of each light source.

To accomplish the above object, according to the invention, there is provided an image processing apparatus for performing a color matching between colors of input and output images, comprising: first correcting means for correcting a deviation of colors to be seen which is caused due to the relation between a light source and a display apparatus on the basis of information regarding the light source in the display apparatus; and second correcting means for correcting a deviation of colors to be seen which is caused due to a difference of the color temperatures between the light sources of the input and output images on the basis of the information of the light sources.

Still another object of the invention is to provide image processing method and apparatus such that when a color matching between colors of input and output images is performed, a deviation of colors which is caused due to a difference of the modes between a material color and a light source color is corrected, and in order to correct a deviation of colors to be seen which is caused due to a difference of the color temperatures between the light sources of the input and output images, such a deviation can be corrected on the basis of information of the light sources.

To accomplish the above object, according to the invention, there is provided an image processing apparatus for performing a color matching between colors of input and output images, comprising: first correcting means for correcting a deviation of colors which is caused due to a difference of the modes between a material color and a light source color; and second correcting means for correcting a deviation of colors to be seen which is caused due to a difference of the color temperatures between the light sources of the input and output images on the basis of information of the light sources.

Further another object of the invention is to provide a method whereby in order to perform a color matching even when color modes are different, a relation between luminances of both of a material color and a light source color to be color matched by the human being is shown, thereby enabling a color matching to be performed even when the color modes differ.

To accomplish the above object, according to the invention, there is provided an image processing apparatus for performing an image process so as to visually match a light source color with a material color, comprising: input means for inputting image data regarding the material color; and converting means for converting the image data regarding the material color into image data regarding the light source color, wherein the converting means performs a conversion process so as to satisfy a relation shown by a curve which monotonously increases and is convex upward on a coordinates plane in which a luminance of the material color is set to an axis of abscissa and a luminance of the light source color is set to an axis of ordinate.

To accomplish the above object, according to the invention, there is provided an image processing apparatus for performing an image process so as to visually match a material color with a light source color, comprising: input means for inputting image data regarding the light source color; and converting means for converting the image data regarding the light source color into image data regarding the material color, wherein said converting means executes a conversion process so as to satisfy a relation shown by a curve which monotonously increases and is convex upward on a coordinates plane in which a luminance of the material color is set to an axis of abscissa and a luminance of the light source color is set to an axis of ordinate.

To accomplish the above object, according to the invention, there is provided an image processing method for performing an image process so as to visually match a material color and a light source color, comprising the steps of: inputting information regarding an observation light source; calculating a luminance component in perception reference white information on the basis of the information regarding the observation light source; calculating a chromaticity component in the perception reference white information by using a color adaptation ratio according to the information regarding the observation light source; and performing a color adaptation conversion process to image data on the basis of the calculated perception reference white information.

The above and other objects and features of the present invention will become apparent from the following detailed description and the appended claims with reference to the accompanying drawings.

BRIEF DESCRIPTION OF THE DRAWINGS

FIG. 1 is a diagram showing an embodiment of the invention;

FIG. 2 is a diagram shown by paying attention to a color correction of a conventional image input/output apparatus;

DETAILED DESCRIPTION OF THE PREFERRED EMBODIMENTS

[Embodiment 1]

Figure 3:
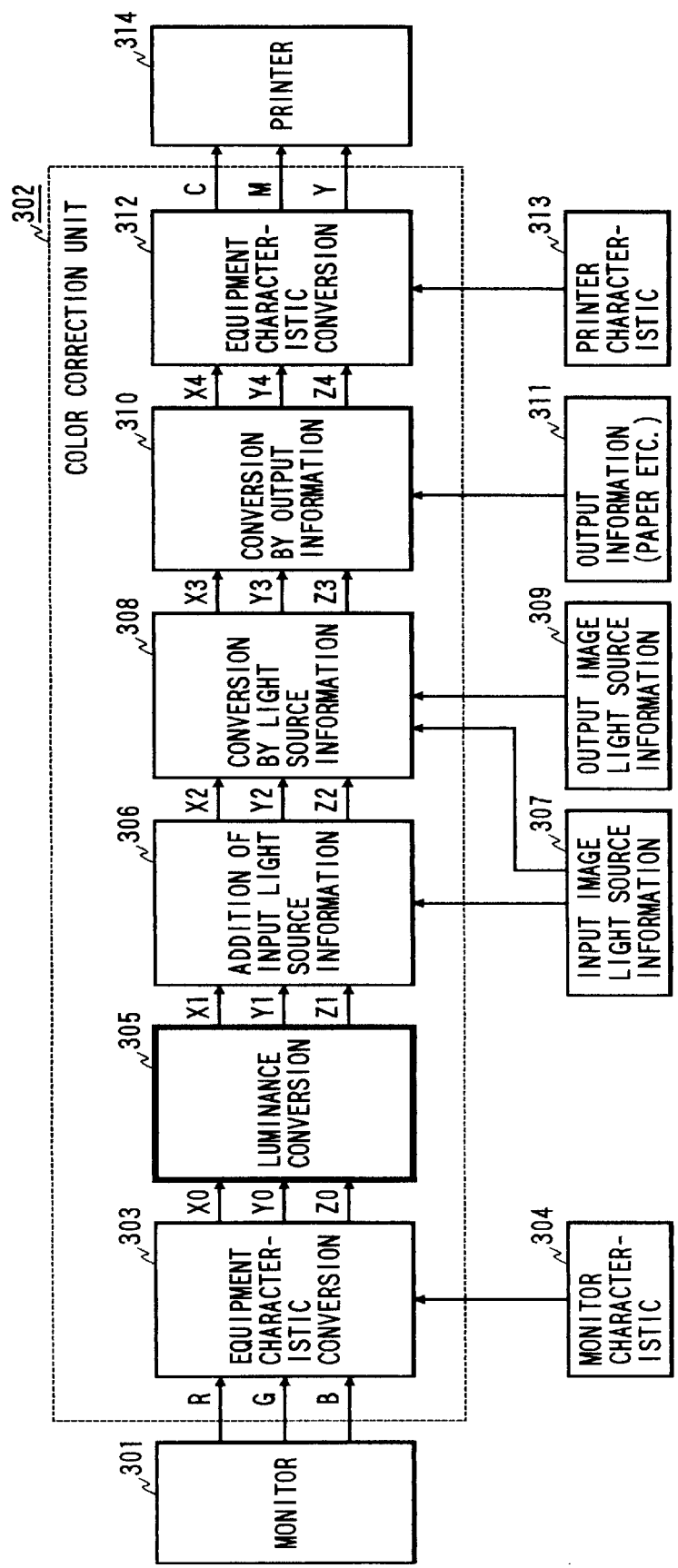
FIG. 3 is a diagram showing an embodiment 1 of the invention.

FIG. 1 shows an embodiment of the invention. According to the embodiment shown in the diagram, in order to enable a material (body) color and a light source color to be seen as a matched color, there is used a color correction unit 2 for performing a correction to raise a luminance in a conversion from an input signal of a display of the light source color into an output signal of a display of the material color and to reduce a luminance in a conversion from the input signal of the material color display into the output signal of the light source color display.

Namely, the input color signals obtained from an image input unit 1 are converted into color signals including a luminance component by the color correction unit 2, a correction of the luminance component as a feature of the invention is performed, and the color signals are finally converted into output color signals necessary in an image output unit 8.

One of the image input unit 1 and image output unit 8 displays the light source color and the other displays the material color. For example, it is now assumed that a combination such that a color monitor is used as a light source color display apparatus and a color printer is used as a material color display apparatus is used. As input color signals or output color signals, RGB signals are used in the color monitor and CMY signals are used in the color printer (such signals are peculiar to input/output equipment). As arbitrary color signals including the luminance component are, for example, XYZ·L*a*b*·xyY·u'V'Y.

It is now assumed that the image input unit 1 in FIG. 1 is a color monitor 301 to display the light source color and the image output unit 8 is a color printer 314 to display the material color. An example in which the material color that is formed by the color printer 314 is matched with the light source color that is displayed by the color monitor 301 will now be described as an embodiment 1 with reference to FIG. 3. It is now assumed that the XYZ system [three stimulus (tristimulus) values] is used as a system of the color signals including the luminance component.

In FIG. 3, monitor characteristic has been stored in an ROM 304. The monitor characteristic shows the relation between RGB data from the color monitor 301 and XYZ obtained by measuring a color of an image on the color monitor displayed by the RGB signals. As such a relation, there are two kinds of relations. The relation between XYZ and a luminance of a fluorescent material (body) has a form of matrix which is expressed by the following equation (1). The relation between the luminance of the fluorescent material and RGB as signals of the monitor has a form of a function called a γ (gamma) function. A method of obtaining the monitor characteristic will now be described. First, the relation between XYZ and the luminance of the fluorescent material is as shown by the equation (1). Each color tag when pure colors of RGB are displayed on the color monitor is measured by using a color measurement unit. Three stimulus values obtained are respectively substituted into the following equations (2), (3), and (4), a matrix is obtained. The other γ function is obtained by measuring the luminance of the fluorescent material for the RGB values as a monitor signal and has a form as shown by the following equation (5). When measuring the luminance of the fluorescent material, a state of dark black is desirable to raise the reliability of data.

$$\begin{pmatrix} L_r \\ L_g \\ L_b \end{pmatrix} = \begin{pmatrix} a_{11} & a_{12} & a_{13} \\ a_{12} & a_{22} & a_{23} \\ a_{31} & a_{32} & a_{33} \end{pmatrix} \begin{pmatrix} X \\ Y \\ Z \end{pmatrix} \quad (1)$$

$a_{11}=\Delta_{11}/(\Delta_{11}X_\omega-\Delta_{21}Y_\omega+\Delta_{31}Z_\omega)$ $a_{12}=\Delta_{21}/(\Delta_{11}X_\omega-\Delta_{21}Y_\omega+\Delta_{31}Z_\omega)$ $a_{13}=\Delta_{31}/(\Delta_{11}X_\omega-\Delta_{21}Y_\omega+\Delta_{31}Z_\omega)$ $a_{21}=\Delta_{12}/(\Delta_{12}X_\omega-\Delta_{22}Y_\omega+\Delta_{32}Z_\omega)$ $a_{22}=\Delta_{22}/(\Delta_{12}X_\omega-\Delta_{22}Y_\omega+\Delta_{32}Z_\omega)$ $a_{23}=\Delta_{32}/(\Delta_{12}X_\omega-\Delta_{22}Y_\omega+\Delta_{32}Z_\omega)$ $a_{31}=\Delta_{13}/(\Delta_{13}X_\omega-\Delta_{23}Y_\omega+\Delta_{33}Z_\omega)$ $a_{32}=\Delta_{23}/(\Delta_{13}X_\omega-\Delta_{23}Y_\omega+\Delta_{33}Z_\omega)$ $a_{33}=\Delta_{33}/(\Delta_{13}X_\omega-\Delta_{23}Y_\omega+\Delta_{33}Z_\omega)$ (2)

$X_\omega=X_r+X_g+X_b$ $Y_\omega=Y_r+Y_g+Y_b$ $Z_\omega=Z_r+Z_g+Z_b$ (3)

Stimulus sum=$X_\omega+Y_\omega+Z_\omega$ where, $X_r, Y_r, Z_r$: three stimulus values XYZ of a fluorescent material R $X_g, Y_g, Z_g$: three stimulus values XYZ of a fluorescent material G $X_b, Y_b, Z_b$: three stimulus values XYZ of a fluorescent material B $\Delta_{ij}$=small matrix of i-row and j-column of $\Delta$ $$\Delta = \begin{vmatrix} x_r & x_g & x_b \\ y_r & y_g & y_b \\ z_r & z_g & z_b \end{vmatrix} \quad (4)$$

where, $x_r, y_r, z_r$: values obtained by dividing $X_r, Y_r,$ and $Z_r$ by the stimulus sum $x_g, y_g, z_g$: values obtained by dividing $X_g, Y_g,$ and $Z_g$ by the stimulus sum $x_b, y_b, z_b$: values obtained by dividing $X_b, Y_b,$ and $Z_b$ by the stimulus sum $L_r=f(R)$ $L_g=f(G)$ $L_b=f(B)$ (5)

In an equipment characteristic conversion circuit 303, by performing a conversion [the following equations (6) and (7)] opposite to that of the equations (5) and (1) to the input signals RGB from the color monitor 301 by using the matrix and the γ function stored in the monitor characteristic ROM 304, thereby converting into color signals $X_0Y_0Z_0$ including a luminance component.

$L_r=f(R)$ $L_g=f(G)$ $L_b=f(B)$ (6)

$$\begin{pmatrix} X_0 \\ Y_0 \\ Z_0 \end{pmatrix} = \begin{pmatrix} a_{11} & a_{12} & a_{13} \\ a_{12} & a_{22} & a_{23} \\ a_{31} & a_{32} & a_{33} \end{pmatrix}^{-1} \begin{pmatrix} L_r \\ L_g \\ L_b \end{pmatrix} \quad (7)$$

The luminance component needs to be converted in order to enable the colors of the color monitor 301 and color printer 314 to be seen as a matched color. For this purpose, a luminance conversion circuit 305 performs a luminance conversion in order to compensate a deviation of colors to be seen which is caused due to a difference of the modes between the light source color and the material color. The luminance component conversion from signals $X_0Y_0Z_0$ of the color monitor 301 as a light source color display apparatus into signals $X_1Y_1Z_1$ of the color printer 314 as a material color display apparatus is a conversion to raise the luminance component. A case of using the following equations (8) as a correcting method will now be described. In the equations (8), (a) denotes a numeral which satisfies the relation (a>1.0) and, preferably, the value of (a) lies within a range from 3 to 5.

The value of (a) can be preset or can be also manually set by the user.

$$X_1 = aX_0 \ (a>1.0)$$

$$Y_1 = aY_0 \ (a>1.0)$$

$$Z_1 = aZ_0 \ (a>1.0) \quad (8)$$

The information of an external light received by the color monitor 301 as input equipment has been stored in an input image light source information ROM 307 as chromaticity values (xyY values and XYZ values). Similarly, the information of an external light received by the color printer 314 as an output equipment has been stored in an output image light source information ROM 309 as chromaticity values (xyY values and XYZ values). As such information, chromaticity values other than xyY·XYZ or spectral data can be used. When the position where the input/output equipment exists differs from that of the light source by which the actual image is observed, the observation light source information of the input image and the observation light source information of the output image can be also replaced.

Observing conditions of the input/output images whose colors were measured by using a sensor or the like can be also inputted.

An adding circuit 306 of the input image light source information performs a correction in consideration of an influence by the input image light source as a correction that is peculiar to the display image.

Namely, a correction such as a surface reflection or the like from the display screen of the monitor 301 for the input image light source, namely, a correction based on the relation between the input image light source and the light emission from the monitor is executed.

Three stimulus values $X_{K1} Y_{K1} Z_{K1}$ as correction amounts have previously been stored in the ROM 307 on the basis of experiments in correspondence to the relation between the input image light source and the monitor.

By substituting the three stimulus values $X_{K1} Y_{K1} Z_{K1}$ stored in the input image light source information ROM 307 into the following equations (9), $X_1 Y_1 Z_1$ are corrected.

$$X_2 = X_1 + X_{K1}$$

$$Y_2 = Y_1 + Y_{K1}$$

$$Z_2 = Z_1 + Z_{K1} \quad (9)$$

In order to enable the color of the image of the color monitor 301 and the color of the image outputted by the color printer 314 to be seen as a matched color, a conversion circuit 308 by the light source information performs a correction in consideration of the light source information (stored in the ROM 307) of the input image and the light source information (stored in the ROM 309) of the output image. In such a correction, $X_2 Y_2 Z_2$ are converted into $X_3 Y_3 Z_3$ by using the following correcting equation (11) using a color adaptation equation (10) of Von Kries. A correction is performed so as to compensate the difference of observation colors which is caused due to a difference of the color temperatures of the light sources by using the chromaticity value of the light source of the input image stored as light source information, the chromaticity value of the light source of the output image, and the chromaticity value of the light source obtained by measuring the color tag at the time of the calculation of the printer characteristic.

Matrix of the equation of Von Kries $$\begin{pmatrix} mg & 2.953(mr-mg) & 0.220(mb-mg) \\ 0 & mr & 0 \\ 0 & - & mb \end{pmatrix} \quad (10)$$

where, mr: 1 mg: $(1.220x_2 - 2.733y_2 - 2.220)y_1/(1.220x_1 - 2.773y_1 - 0.220)/Y_2$ mb: $(1-x_2-y_{2y1})/(1-x_1-y_2)/y_2$ $x_1, y_1$: chromaticity value by the light source 1

$x_2, y_2$: chromaticity value by the light source 2

$$\begin{pmatrix} X_3 \\ Y_3 \\ Z_3 \end{pmatrix} = \begin{pmatrix} M2 \end{pmatrix} \begin{pmatrix} M1 \end{pmatrix} \begin{pmatrix} X_2 \\ Y_2 \\ Z_2 \end{pmatrix} \quad (11)$$

A matrix M1 of the equation (11) is obtained by substituting the chromaticity values (xy values) stored in the input/output light source information into the equation (10) by using the light source 1 as an observation light source of the input image and by using the light source 2 as an observation light source of the output image.

A matrix M2 is obtained by substituting the chromaticity values (xy values) stored in the input/output light source information ROM into the expression (10) by using the light source 1 as an observation light source of the output image and by using the light source 2 as a light source (for example, C light source) obtained by measuring the color tag at the time of the calculation of the printer characteristic.

By correcting as mentioned above, the correction can be performed in accordance with the color temperature of the observation light source. Even when the color temperatures of the light sources of the input image and output image are different, the colors of the images can be matched.

Even when performing a printer output to a paper, there is a case where the colors of papers and the absorption amounts of inks differ. Therefore, a correcting equation to make the most of the characteristic is stored in an output information ROM 311 and a correction is executed in a conversion circuit 310 by the output information. For example, although the correction is not performed in case of a normal paper, in case of a coating paper, the correction is executed in accordance with a correcting equation stored in the output information.

The printer characteristic has been stored in an ROM 313. The printer characteristic shows the relation between the CMY data that is inputted to the color printer 314 and the XYZ when the color tag printed is measured by the input data. The relation between CMY and XYZ has been stored as an LUT.

Figure 4:
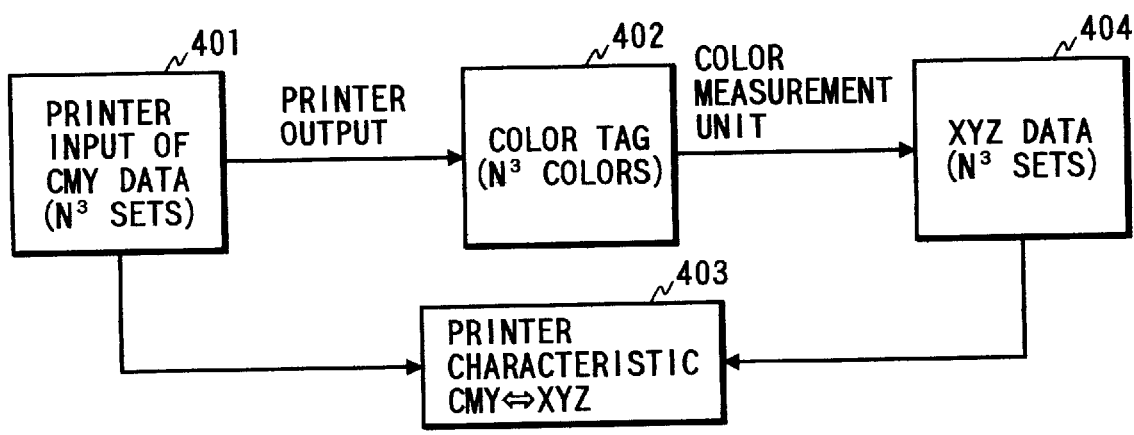
FIG. 4 is a diagram showing a method of obtaining printer characteristic values.

A method of obtaining the printer characteristic will now be described with reference to FIG. 4. Certain CMY data 401 is inputted to the printer and a certain color tag is printed. Such a color tag 402 is measured by using a color measurement unit under a standard light source (for example, C light source), thereby obtaining XYZ values 404. The XYZ values here don't correspond to a reflectance which is obtained by using a standard white plate but shows absolute values obtained as color measurement values and use the luminance as a unit. As mentioned above, $N^3$ sets of relations between the CMY data and the XYZ values are obtained as a form of LUT. An LUT interpolation or the like can be also used as a relation between the CMY and the XYZ.

Returning again to FIG. 3, an equipment characteristic conversion circuit 312 converts the color signals XYZ obtained by correcting the luminance component into the printer output signals CMY by using the LUT in which the printer characteristic has been stored.

As mentioned above, the deviation of colors to be seen which is caused due to the difference of the modes between the light source color and the material color can be compensated by the luminance conversion circuit 305.

Therefore, the color matching between output apparatuses such as monitor and printer having different modes can be performed.

The compensation for an influence by the input/output image light sources can be performed by the addition (306) of the input light source information and the conversion (308) by the light source information. Namely, by performing the correction of the surface reflection or the like that is peculiar to the display image and the correction for the difference of the color temperatures, the color matching can be executed irrespective of the input/output image light sources.

Further, since the correction which is peculiar to the image forming apparatus for forming an image onto a recording medium and is based on the characteristics of the recording medium is executed by the conversion (310) by the output information, the color matching can be performed irrespective of the recording medium.

[Embodiment 2]

Figure 5:
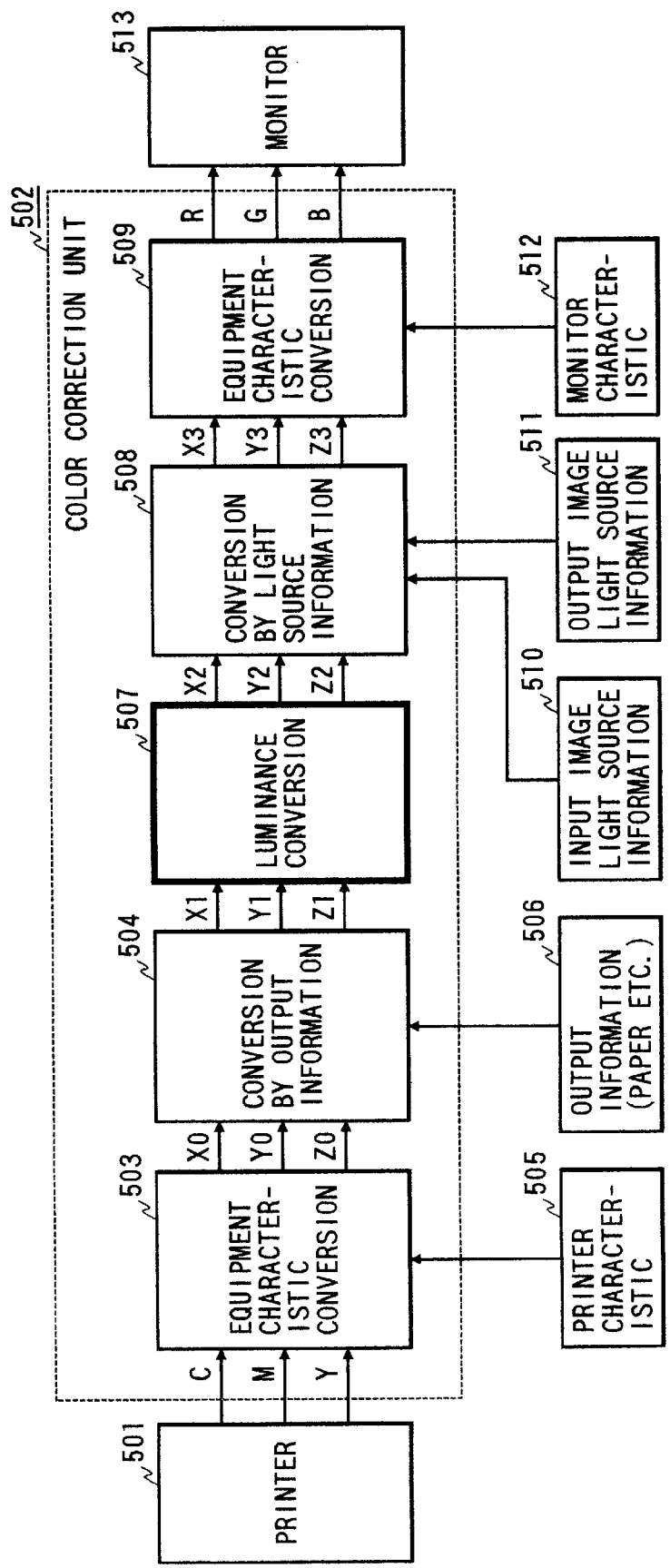
FIG. 5 is a diagram showing the embodiment 2 of the invention.

A case of converting the data of the material color into the data of the light source color as shown in FIG. 5 will now be described as a conversion opposite to that shown in the embodiment 1. Namely, the embodiment 2 relates to the case of previewing a print image onto a color monitor 513 on the basis of a signal which is sent to a color printer 501. In other words, a case where the color printer 501 to output the material color is used as an image input unit and the color monitor 513 to display the light source color is used as an image output unit will now be described with reference to FIG. 5.

When the image is previewed on the color monitor 513 on the basis of the signal of the color printer 501, the input signal values from the color printer 501 are corrected by a color correction unit 502. Resultant correction values become input signal values of the color monitor 513. The color correction unit 502 will now be described in detail.

The printer characteristic stored in an ROM 505 is obtained by a method similar to that in the embodiment 1. That is, the relation between the CMY data which is inputted to the color printer 501 and the XYZ when the color tag printed by the input data is measured has been stored as an LUT.

An equipment characteristic conversion circuit 503 converts the signals CMY from the color printer 501 into the color signals $X_0Y_0Z_0$ including the luminance component by using the matrix stored as such printer characteristic.

When the printer output is performed onto a paper, since there is a case where the colors of papers, absorption amounts of inks, and the like differ depending on the kinds of them, a correcting equation to make the most of such characteristic has been stored in an output information ROM 506. A conversion circuit 504 by the output information executes a conversion opposite to that in case of the embodiment 1 and converts the signals into the color signals $X_1Y_1Z_1$ which don't include the correction by the output information.

It is necessary to convert the luminance component in order to reconstruct the image that is outputted by the color printer 501 on the color monitor 513 at a high fidelity and to enable both colors to be seen as a matched color. A luminance conversion circuit 507, therefore, performs a conversion so as to reduce the luminance component in case of converting into the signals $X_2Y_2Z_2$ of the color monitor 513 as a light source color display apparatus on the basis of the signals $X_1Y_1Z_1$ of the color printer 501 as a material color display apparatus. As a correcting method here, a case of using the following equations (12) as a conversion opposite to that of the equations (8) will now be described.

$$X_2 = 1/a \times X_1 \ (a > 1.0)$$
$$Y_2 = 1/a \times Y_1 \ (a > 1.0)$$
$$Z_2 = 1/a \times Z_1 \ (a > 1.0) \quad (12)$$

The information of the external light received by the color printer as an input equipment has been stored as chromaticity values (xyY values) in an input image light source information ROM 510. Similarly, the information of the external light received by the color monitor as an output equipment has been stored as XYZ values in an output image light source information ROM 511.

To enable the image by the color printer 501 and the image displayed on the color monitor 513 which were observed under different light sources to be seen as a same color, a correction is performed in consideration of the light source information (stored in the ROM 510) of the input image and the light source information (stored in the ROM 511) of the output image in a conversion circuit 508 by the light source information. The chromaticity value of the light source of the input image and the chromaticity value of the light source of the output image which were stored as light source information and the chromaticity value of the light source obtained by measuring the color tag at the time of the calculation of the printer characteristic are used and are substituted into the expression (10) and equation (11) similar to those in the embodiment 1, so that the correction can be performed.

The matrix M1 of the equation (11) is obtained by substituting the chromaticity values (xy values) stored in the input/output light source information into the expression (10) by using the light source 1 as a light source obtained by measuring the color tag at the time of the calculation of the printer characteristic and by using the light source 2 as an observation light source of the input image.

The matrix M2 is obtained by substituting the chromaticity values (xy values) stored in the input/output light source information ROM into the expression (10) by using the light source 1 as an observation light source of the input image and by using the light source 2 as an observation light source of the output image.

By performing the correction as mentioned above, the correction according to the observation light source can be performed. Even if the light sources of the input and output images differ, the colors of the images can be matched.

Monitor characteristic stored in the ROM 512 is obtained by a method similar to that in the embodiment 1. Namely, the monitor characteristic shows the relation between the RGB data from the color monitor 513 and XYZ obtained by measuring the color of the image on the monitor displayed by the signal. Such a relation has a form of a matrix and a gamma ($\gamma$) function.

An equipment characteristic conversion circuit 509 performs a conversion using the matrix and $\gamma$ function stored in the monitor characteristic ROM 512, thereby converting from the XYZ values corrected as mentioned above into the output color signals RGB of the color monitor 513.

Although the correcting equations using proportional constants have been used for the luminance correction in each of the above embodiments, as other cases, there are a case of being proportional to the square, a case of applying an offset, a case of a γ function, a case of correcting by using the difference, and the like. In any case, it is sufficient to correct so that the luminance of the material color is higher than the luminance of the light source color.

According to the embodiments 1 and 2 as described above, even when the observation environment of the light source color and material color is any environment, by correcting the luminance component, both of the colors can be matched.

Namely, the image processing method and apparatus which can properly correct when performing the signal conversion between the material color and the light source color can be obtained.

The image processing method and apparatus which can perform a constant color correction irrespective of the display characteristic of the display apparatus to be used can be obtained.

Further, the image processing method and apparatus which can obtain the specific and proper correction form can be obtained even in not only the conversion from the light source color display into the material color display but also the conversion from the material color display into the light source color display.

The color matching of the input and output images can be performed at a high precision.

[Embodiment 3]

In the embodiment 3, an image process for clarifying the relation when performing a perception color matching between the material color and the light source color and for realizing a color matching between the light source color and the material color on the basis of the above relation will now be described in detail.

First, to calculate the relation of the luminances when the perception color matching between the material color and the light source color was performed, the luminance of the printed matter is set to a constant value to thereby change the luminance of the monitor and whether the eye observation color matching can be performed under each condition or not was examined. Further, by changing the luminance of the observation light source, the luminance of the printed matter is also changed, thereby obtaining the relation between the luminance of the printed matter and the luminance of the monitor to be color matched. It has consequently been found that such a relation can be seen by a curve which monotonously increases and becomes convex upward on the coordinates plane in which the luminance of the material color is set to an axis of abscissa and the luminance of the light source color is set to an axis of ordinate as shown in FIG. 7.

Figure 7:
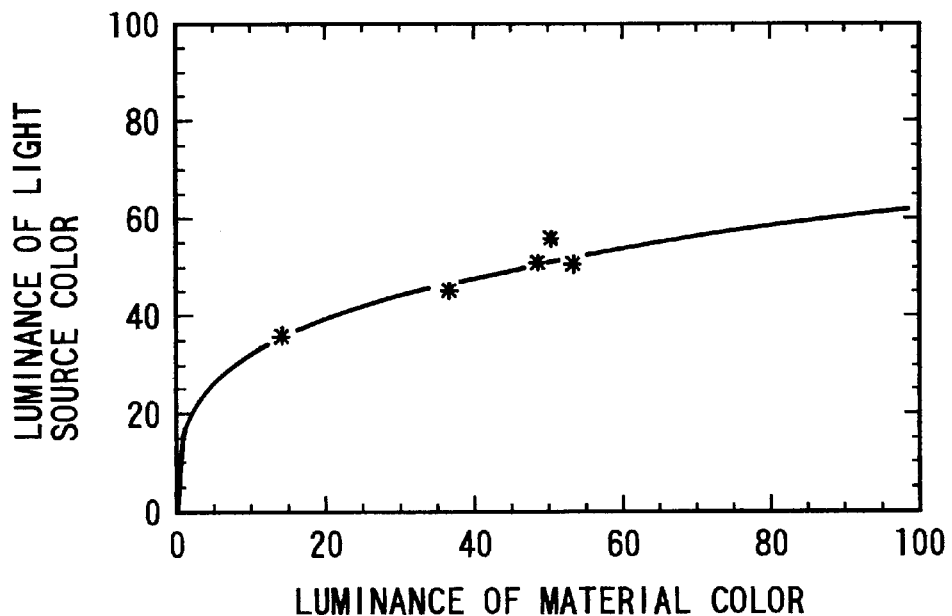
FIG. 7 is a diagram showing the relation between luminances of a material color and a light source color when they are matched.

Although the coordinates of the graph shown in FIG. 7 are changed due to the observation light source or the like, the shape of graph is not changed in any case.

By calculating both of the luminances so as to satisfy the above relation, therefore, the material color and the light source color can be matched.

Even when assembling into the system, by using the present method at the time of the calculation of the luminance of the perception reference white serving as a perception reference in case of observing the light source color that is necessary for the adaptation conversion and by converting the image on the basis of the perception reference white calculated as mentioned above, the luminances of the whole image of the material color and light source color can be converted so as to satisfy the relation of FIG. 7. Therefore, even for the images of different color modes, both of the colors can be visually matched.

An example of the system to which the present method is applied will now be described hereinbelow.

An image input/output system having a previewer function in which a printed matter is read by a scanner or the like and is displayed to a monitor and the displayed image and the printed matter can be compared at that location will now be described as an example. The invention is not limited to the embodiments but can be also obviously applied to every case of performing a conversion of the light source color and the material color. In the embodiment, a process in case of observing the printed matter under the same light source as the light source in which the monitor is installed is shown.

Figure 6:
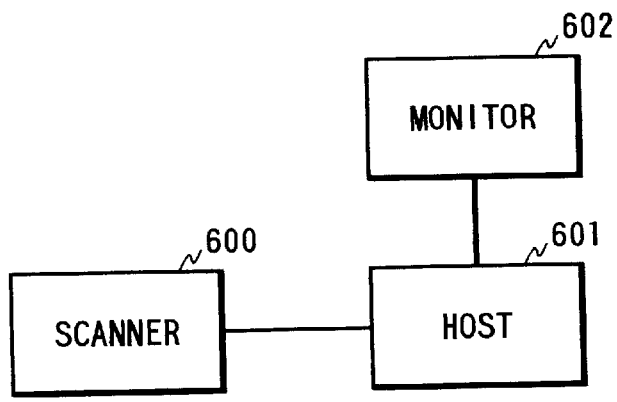
FIG. 6 is a diagram showing an outline of a system in the embodiment 1.

FIG. 6 shows an outline of the system of the embodiment. The system is constructed by a scanner 600, a host 601, and a monitor 602.

The scanner 600 is a full color scanner which is generally used in a color copying apparatus. By reading an image of an original put on an original supporting base plate, for example, RGB signals are obtained.

In the host 601, image processes such as an image conversion process and the like according to observation light source information, which will be explained hereinlater are executed by a CPU on the basis of programs stored on a hard disk in the host and the processing result is outputted to the monitor 602.

The monitor 602 displays a preview image corresponding to the original image on the basis of the image data from the host.

Figure 9:
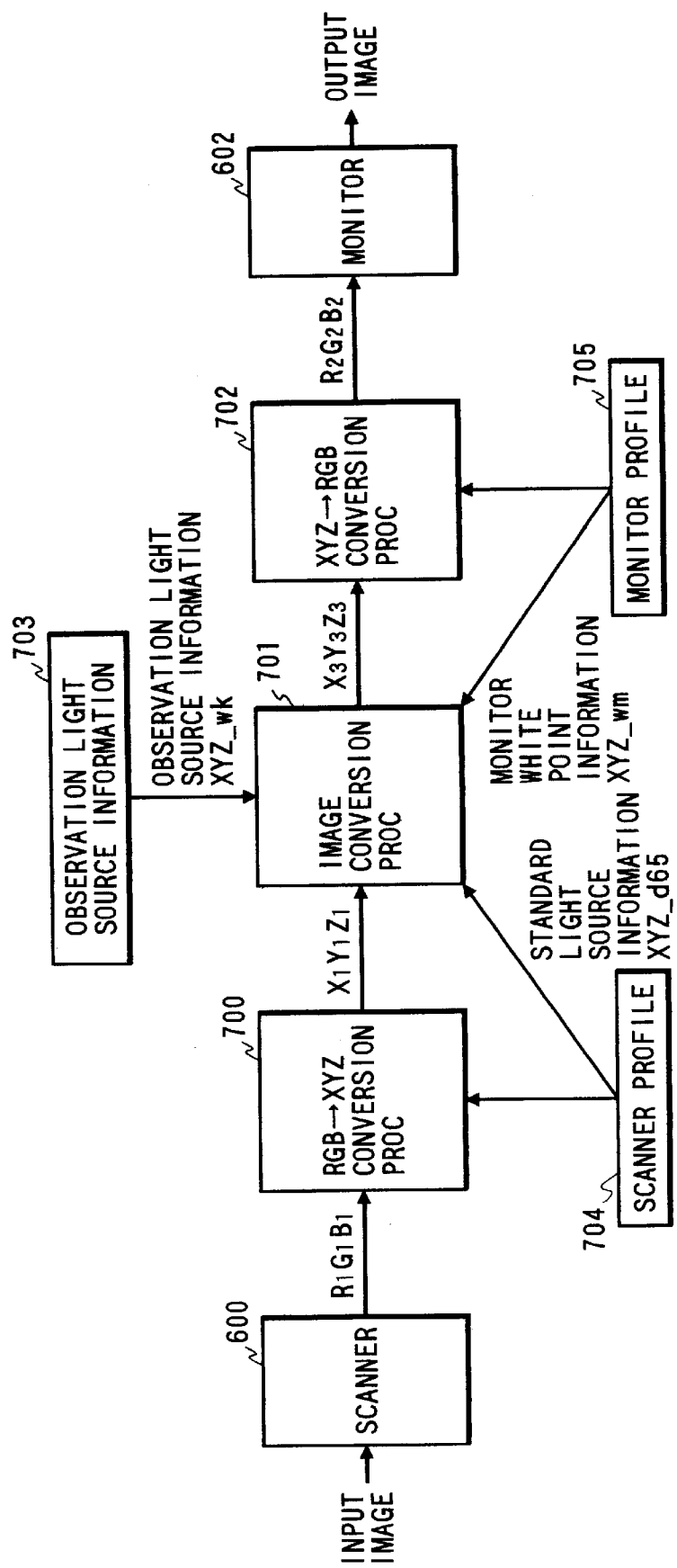
FIG. 9 is a diagram showing a flow of data in the embodiment 1.

A flow of the processes which are executed by the CPU of the host 601 will now be described hereinbelow with reference to FIG. 9.

RGB image data $(R_1G_1B_1)$ derived by the scanner 600 is converted into $X_1Y_1Z_1$ by an RGB→XYZ conversion process 700 on the basis of a scanner profile in which scanner color characteristic has been stored. $X_1Y_1Z_1$ is obtained by using D65, which is a standard light source in the scanner, as a reference.

In an image conversion process 701, to form an image also in consideration of a difference of the observation light sources of the input and output images and a difference of the color modes, an image conversion using the print image, observation light source information 703 of the monitor, and characteristic of the monitor to display and observe the image is executed, thereby converting into $X_2Y_2Z_2$.

Figure 10:
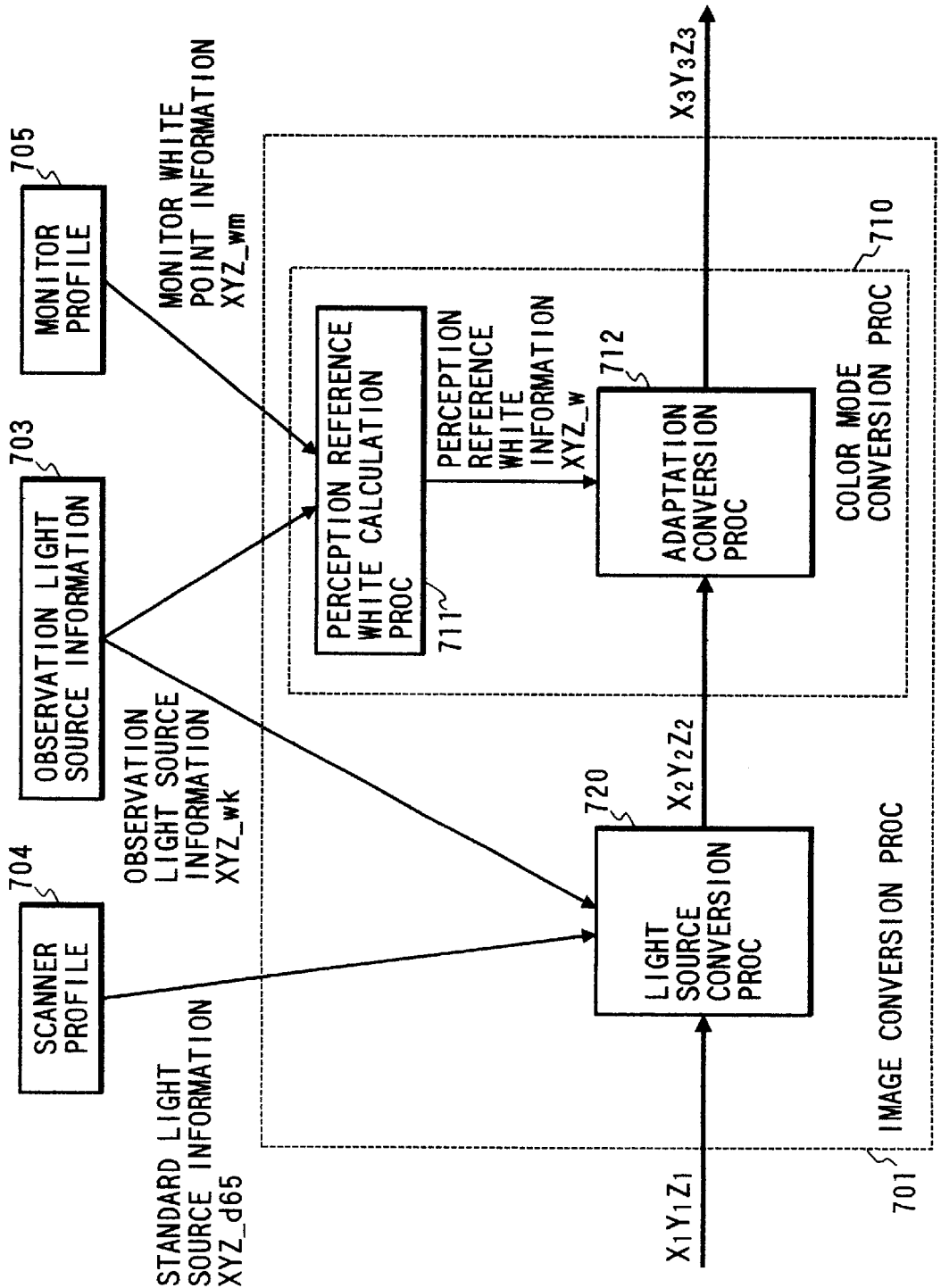
FIG. 10 is a diagram showing in detail an image conversion process.

The image conversion process 701 will now be described in detail with reference to FIG. 10. A light source conversion process 720 for converting the image in accordance with the observation light source and a color mode conversion process 710 for converting in accordance with a mode of an image are included in the image conversion process 701 shown in FIG. 4.

In the light source conversion process 720, the image is converted into an image according to the observation light source. The $X_1Y_1Z_1$ data obtained by converting from the scanner data $R_1G_1B_1$ by using the standard light source (D65) as a reference is color adaptation converted into color signals $X_2Y_2Z_2$ according to the light source to actually observe the image by using the following equation (13)

The equation is a color adaptation conversion equation of Von Kries.

The equations (13) are color sequential conversion system of Von Kries.

(13) The color sequential equation of Von Kries.

$$\begin{pmatrix} X_2 \\ Y_2 \\ Z_2 \end{pmatrix} = \begin{pmatrix} M \end{pmatrix}^{-1} \begin{pmatrix} D \end{pmatrix} \begin{pmatrix} M \end{pmatrix} \begin{pmatrix} X_1 \\ Y_1 \\ Z_1 \end{pmatrix}$$

where, $$(D) = \begin{pmatrix} Lw2/Lw1 & 0 & 0 \\ 0 & Mw2/Mw1 & 0 \\ 0 & 0 & Sw2/Sw1 \end{pmatrix}$$

$$(M) = \begin{pmatrix} 0.071 & 0.945 & -0.016 \\ -0.461 & 1.360 & 0.101 \\ 0 & 0 & 1.0 \end{pmatrix}$$

$$\begin{pmatrix} L_{w1} \\ M_{w1} \\ S_{w1} \end{pmatrix} = (M) \begin{pmatrix} X_{w1} \\ Y_{w1} \\ Z_{w1} \end{pmatrix},$$

$$\begin{pmatrix} L_{w2} \\ M_{w2} \\ S_{w2} \end{pmatrix} = (M) \begin{pmatrix} X_{w2} \\ Y_{w2} \\ Z_{w2} \end{pmatrix}$$

$L_{w1}$, $M_{w1}$, $S_{w1}$: response amounts at the conical body level of the eyes for $X_{w1}$, $Y_{w1}$, $Z_{w1}$ $X_{w1}$, $Y_{w1}$, $Z_{w1}$: three stimulus values of an examination light $L_{w2}$, $M_{w2}$, $S_{w2}$: response amounts at the conical body level of the eyes for $X_{w2}$, $Y_{w2}$, $Z_{w2}$ $X_{w2}$, $Y_{w2}$, $Z_{w2}$: three stimulus values of a reference light Specifically speaking, white points ($X_{d65}Y_{d65}Z_{d65}$) of the standard light source (D65) at the time of the formation of the scanner profile which have been stored in a scanner profile 704 are set to three stimulus values of the examination light, the observation light source information ($X_{wk}Y_{wk}Z_{wk}$) 703 is substituted into the equation (13) as three stimulus values of the reference light, thereby converting into the data $X_2Y_2Z_2$ according to the observation light source. As observation light source information 703, any ones of the values measured by using an external sensor or the like and the values selected or inputted by the user can be used.

In the color mode conversion process 710, the XYZ data ($X_2Y_2Z_2$) converted in accordance with the observation light source is subjected to the color mode conversion between the material color and the light source color so that the display image as a light source color and the original image as a material color can be seen as color matched images.

A perception reference white calculation process 711 and an adaptation conversion process 712 using the calculated data are included in the color mode conversion process 710 as shown in FIG. 5.

It is known that the human being looks at the color of an image while using certain white as a reference and, when seeing a printed matter, the human being is adapted to white of the light source which is observed and, when seeing the monitor, the human being is adapted to both of white of the monitor observation light source and a white point of the monitor at a certain ratio.

White serving as a reference when seeing the color on the monitor assumes a perception reference white.

When comparing the printed matter put under a certain light source with the display image, first, a perception reference white point of the monitor is calculated and the display image is formed on the basis of white data indicative of the perception reference white point.

In the embodiment, since it is assumed that the printed matter and the monitor are observed under the same light source, the observation light source information of the printed matter and the observation light source information of the monitor are equal and they are set to the observation light source information in the diagrams.

In the perception reference white calculation process 711, perception reference white is formed by using the monitor white point information stored in a monitor profile 705 and the observation light source information 703. By using the perception reference and observation light source information, a color adaptation conversion process using the equation (13) is executed.

Figure 11:
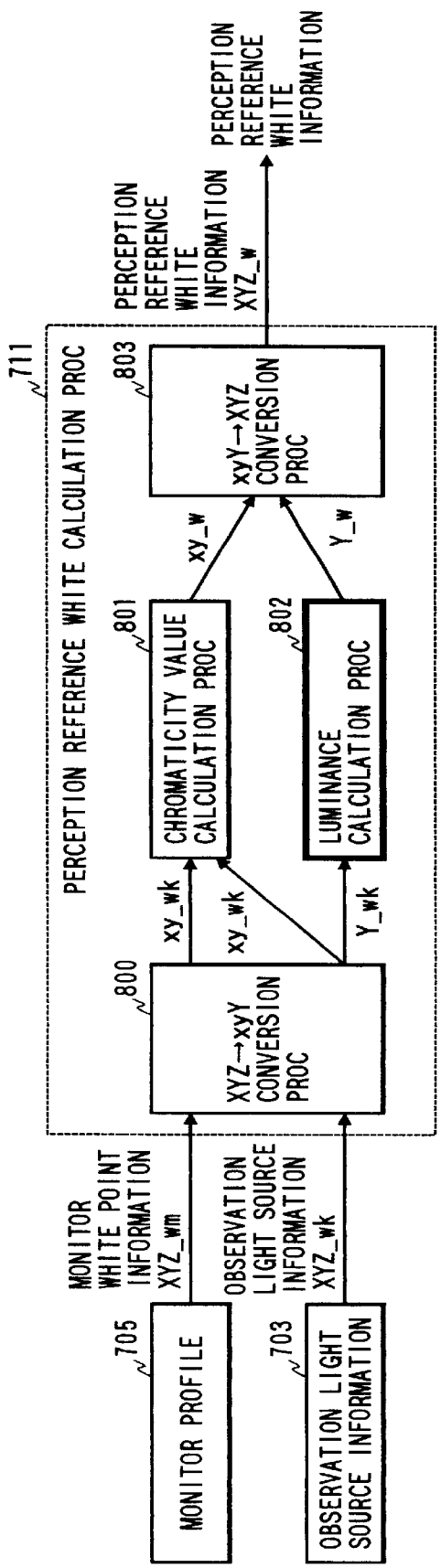
FIG. 11 is a diagram showing in detail a perception reference white calculation process.

As shown in detail in FIG. 11, the perception reference white is calculated separately with respect to the chromaticity and the luminance.

First, monitor white point information ($X_{wm}Y_{wm}Z_{wm}$) stored in the monitor profile 705 and the three stimulus values of the observation light source information ($X_{wk}Y_{wk}Z_{wk}$) 703 obtained from the sensor or the like are converted into the chromaticity (xy) and luminance (Y) by an XYZ to xyY conversion process 800. The chromaticity is substituted into a chromaticity value calculation process 801 and the luminance is substituted into a luminance calculation process 802, thereby calculating a chromaticity ($x_w, y_w$) and a luminance ($Y_w$) of perception reference white, respectively.

Figure 8:
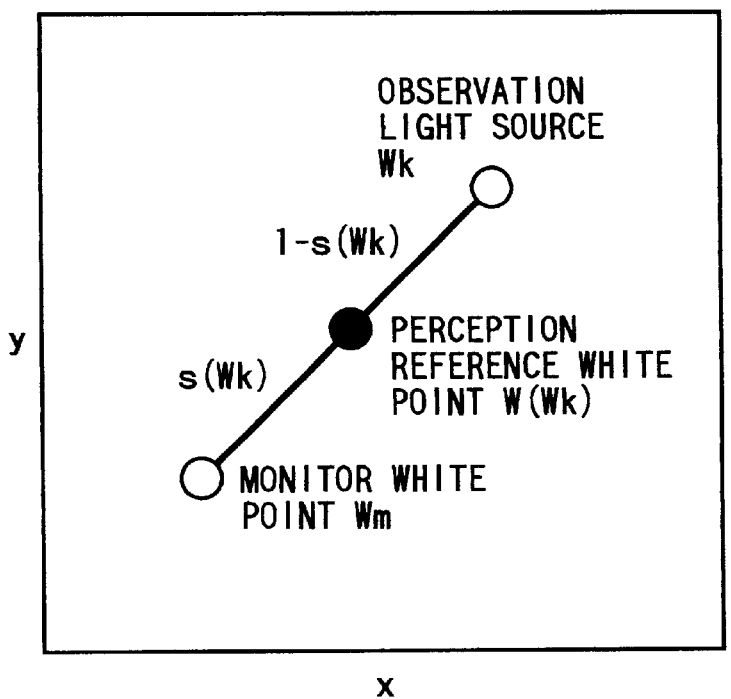
FIG. 8 is a diagram showing the relation of chromaticities when calculating perception reference white.

As disclosed in Japanese Patent Application No. 7-258631, now assuming that a ratio adapted to white of the monitor is set to s and a ratio adapted to the observation light source is set to 1−s and chromaticity values of the observation light source are set to $x_{wk}, y_{wk}$ and the chromaticity values of the monitor white are set to $x_{wm}, y_{wm}$, the chromaticity values $x_w, y_w$ of the perception reference white signals are obtained by the following equations (14). As shown in FIG. 8, it shows that the perception reference white serving as a reference when seeing the color is located between the white of the monitor and the white of the observation light source.

Since the adaptation ratios to white of the monitor and to white of the observation light source differ every observation light source at the time of the observation of the image, the adaptation ratios s and 1−s are changed by the observation light source. In association with it, the reference white point also changes every light source.

(Equation 14) Chromaticity values of perception reference white $$x_w = (1-s) \cdot x_{wk} + s \cdot x_{wm}$$

$$y_w = (1-s) \cdot y_{wk} + s \cdot y_{wm}$$

The luminance of perception reference white of the monitor can be presumed on the basis of the experimental result shown in FIG. 7. Even when using the following equations (15) of Haubner, P., now assuming that an axis of abscissa shows a luminance of the ambient field of view and an axis of ordinate shows a luminance of the examination field of view, it has been confirmed that the luminance of the perception reference white of the monitor fairly accurately coincides with the experimental result shown in FIG. 7.

Figure 12:
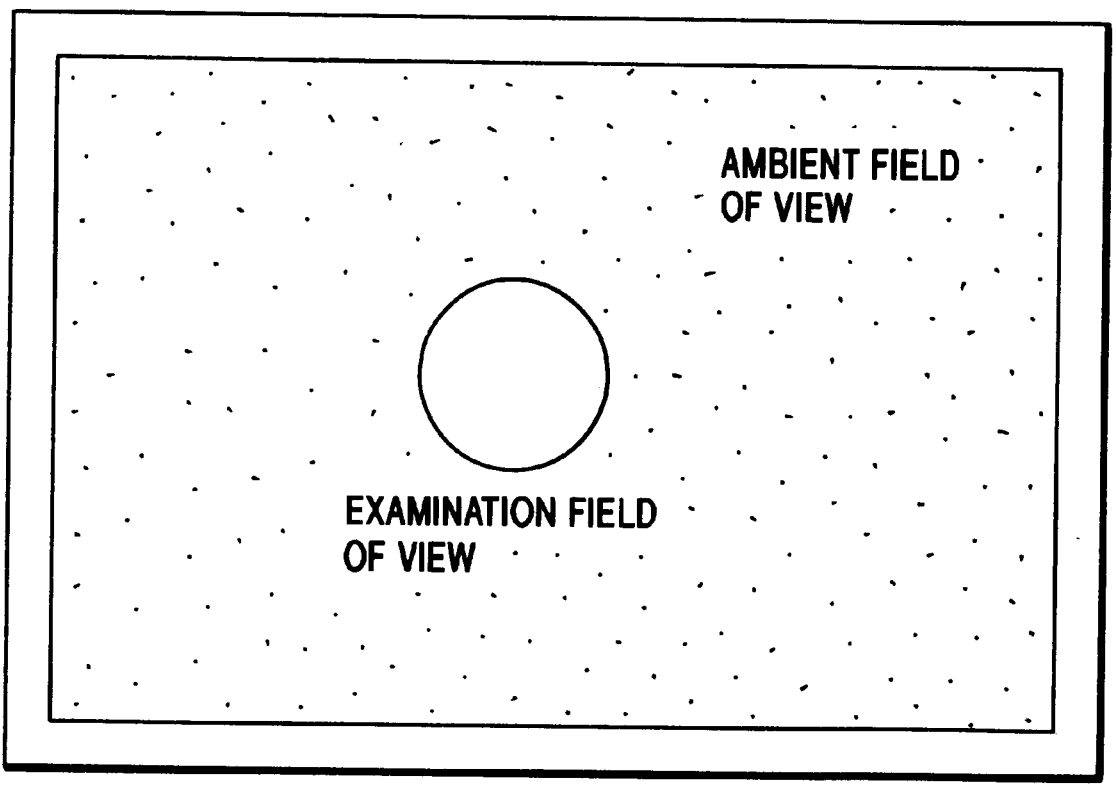
FIG. 12 is a diagram showing experiment conditions of a luminance contrast sensitivity.

As shown in FIG. 12, the equations of Haubner, P. are equations such that when there is an examination field of view of a different brightness exists in an ambient field of view having a certain brightness, the brightness of the examination field of view which the human being perceives and the actual brightness are made correspond and are ones of equations showing the luminance contrast sensitivities. Now, the above relation is expanded to the perception relation of the brightnesses between the material color and the light source color and is used as a relational equation when calculating a luminance of the perception reference white of the light source color.

Particularly, in the embodiment, by setting the luminance of the ambient field of view to the luminance of the observation light source and by setting the luminance of the examination field of view to the perception reference white, the luminance value of the perception reference white can be obtained by using the following equations (15) from the luminance value of the observation light source. Therefore, now assuming that the luminance value of the observation light source is set to an axis of abscissa and that the luminance value of the perception reference white is set to an axis of ordinate, it can be said that the relation between the luminance value of the observation light source and the luminance value of perception reference white is the relation which satisfies a curve that monotonously increases and is convex upward in a manner similar to FIG. 7.

(Equation 15) Luminance value of perception reference white.

$$H = C_t(\phi) L_t^n - H_0(L_u, \phi)$$

$$H_0(L_u, \phi) = C_t(\phi)[S_0(\phi) + S_1(\phi) L_u^n]$$

where,

H: brightness sense for the stimulus $L_t$ $L_t$: luminance of the examination field of view of an apparent size (angle of view) $\phi$ expressed by a minute $L_u$: luminance of the ambient field of view having an angle of view 180° around the examination field of view $C_t(\phi)$, $S_0(\phi)$, $S_1(\phi)$: functions n: constant The chromaticity values $(x_w, y_w)$ of perception reference white obtained by the chromaticity calculation process 801 and the chromaticity value $Y_w$ of perception reference white obtained by the luminance calculation process 802 are converted into XYZ by an xyY→XYZ conversion process 803 and are outputted to the adaptation conversion process as perception reference white information $(X_w Y_w Z_w)$.

The data $X_2 Y_2 Z_2$ obtained by performing the light source conversion on the basis of the perception reference white information $(X_w Y_w Z_w)$ calculated by the equations (14) and (15) and the observation light source information $(X_{wk} Y_{wk} Z_{wk})$ obtained from the sensor or the like by using the equations (13), thereby finally obtaining data $X_3 Y_3 Z_3$ which was converted also in consideration of the color mode and which is displayed to the monitor.

Specifically speaking, the observation light source information $(X_{wk} Y_{wk} Z_{wk})$ are substituted as three stimulus values of the examination light into the equations (13) and the perception reference white information $(X_w Y_w Z_w)$ of the monitor calculated by the equations (14) and (15) are substituted as three stimulus values of the reference light into the equations (13), so that the data in which the differences of not only the observation light source.but also the color mode were corrected is obtained.

Eventually, the luminance value of the observation light source serving as a perception reference of both of them and the luminance value of perception reference white satisfy the relation as shown in FIG. 7. All of the colors in the image are converted by using the ratio of the reference data by the equations (13). Therefore, when the input data $(X_1 Y_1 Z_1)$ of the material color of a certain color and the output data $(X_3 Y_3 Z_3)$ of the light source color after completion of the conversion are compared, not only the luminance $(Y_{wk})$ of the observation light source and the luminance $(Y_w)$ of perception reference white but also the luminances $(Y_2, Y_3)$ of the material color and the light source color satisfy the relation as shown in FIG. 7.

Since the output data $X_3 Y_3 Z_3$ obtained by correcting the differences of the observation light source and the color mode is converted into the monitor output signals, it is converted into $R_2 G_2 B_2$ by an XYZ→RGB conversion process 702 on the basis of the monitor profile in which the monitor color characteristic has been stored.

When the image which was monitor outputted on the basis of the converted color signals and the original read by the scanner are compared, even when the color modes such as light source color and material color are different, an image which the human being can feel those colors as if they were color matched can be formed.

In the embodiment, the luminance value and chromaticity value of perception reference white are calculated by different processes in accordance with influences which are exerted on them from the observation light source, respectively. Therefore, perception reference white can be calculated at a high precision. The color adaptation conversion process between the light source color and the material color can be preferably executed.

Since the color adaptation conversion process is executed to the image data which doesn't depend on the input/output devices, the color matching process (RGB→XYZ conversion process, XYZ→RGB conversion process) according to the scanner profile and the monitor profile and the color adaptation conversion process can be preferably matched.

[Modification of the Embodiment 3]

Different from the embodiment 3, even when the observation light source of the printed matter and the observation light source of the monitor are different light sources, the luminance of perception reference white can be calculated by the equations (15) and this is equivalent to that such a luminance satisfies the same relation as that in FIG. 7. In such a case, when monitor perception reference white using the equations (14) and (15) is calculated, the monitor observation light source information is substituted and, when the image conversion using the equations (13) is performed, the observation light source information of the printed matter is substituted, so that an effect similar to that of the embodiment 3 can be obtained.

Although the relation of the luminance contrast sensitivity of Haubner, P. has been used as a relation of the luminances between the light source color and the material color, the invention can be also applied to other equations showing the luminance contrast sensitivity or the other equations so long as such an equation satisfies the relation which is shown by a curve that monotonously increases and is convex upward on the coordinates plane in which the luminance of the material color is shown by an axis of abscissa and the luminance of the light source color is shown by an axis of ordinate.

[Other Embodiments]

The present invention can be also applied to a system constructed by a plurality of equipment (for example, a host computer, an interface equipment, a reader, a printer, etc.) or can be also applied to an apparatus comprising one equipment (for example, a copying apparatus or a facsimile apparatus).

The invention embodied by supplying program codes of a software to realize the functions of the foregoing embodiments to a computer in an apparatus or system connected to various devices so as to make the various devices operative in order to realize the functions of the foregoing embodiments and by making those various devices operative in accordance with the programs stored in the computer (CPU or MPU) of the system or apparatus is also incorporated in the scope of the present invention.

In such a case, the program codes themselves of the software realize the functions of the foregoing embodiments. The program codes themselves and means for supplying the program codes to the computer, for example, a memory medium in which the program codes have been stored constructs the invention.

As a memory medium to store the program codes, for example, a floppy disk, a hard disk, an optical disk, a magnetooptic disk, a CD-ROM, a magnetic tape, a nonvolatile memory card, an ROM, or the like can be used.

It will be obviously understood that not only in a case where the functions of the foregoing embodiments are realized by executing the supplied program codes by the computer but also in a case where the functions of the foregoing embodiments are realized by operating the program codes in cooperation with the OS (operating system) by which the program codes operate in the computer or with another application software or the like, those program codes are also included in the embodiments of the invention.

Further, it will be also obviously understood that a case where after the supplied program codes were stored into a memory provided for a function expansion board of the computer or a function expansion unit connected to the computer, a CPU provided for the function expansion board or function expansion unit executes a part or all of the actual processes on the basis of instructions of the program codes and the functions of the foregoing embodiments are realized by such processes is also included in the invention.

It is also possible to construct in a manner such that a plurality of tables for executing image conversion processes according to certain observation light source information, a scanner profile, and a monitor profile are prepared, an arbitrary table is selected, and the image conversion processes are executed by using the selected table.

Although the present invention has been described above with respect to the preferred embodiments and modifications, the invention is not limited to the foregoing embodiments but many modifications and variations are possible within the spirit and scope of the appended claims of the invention.

What is claimed is:

1. An image processing method, comprising the steps of:
   inputting information regarding an observation light source, the observation light source being a light source for illumination of an output image observed by a user;
   calculating a luminance component of perception reference white information on the basis of the information regarding the observation light source;
   generating a chromaticity component of the perception reference white information by performing a process using a first color adaptation ratio according to the information regarding the observation light source, a second color adaptation ratio according to white information of a display, and the information regarding the observation light source; and
   performing a color appearance conversion process on image data on the basis of the calculated luminance component and the generated chromaticity component of the perception reference white information.

2. A method according to claim 1, wherein the image data is color appearance converted into the image data which depends on the observation light source, on the basis of the information regarding the observation light source.

3. A method according to claim 1, wherein the luminance component of the perception reference white information is converted on the basis of a luminance component of the observation light source.

4. A method according to claim 3, wherein the luminance component of the perception reference white information is obtained by converting the luminance component of the observation light source using a conversion curve that monotonously increases and becomes convex upward.

5. A recording medium which stores a program for performing an image processing method, comprising the steps of:
   inputting information regarding an observation light source, the observation light source being a light source for illumination of an output image observed by a user;
   calculating a luminance component of perception reference white information on the basis of the information regarding said observation light source;
   generating a chromaticity component of the perception reference white information by performing a process using a first color adaptation ratio according to the information regarding said observation light source, a second adaptation ratio according to white information of a display, and the information regarding said observation light source; and
   performing a color appearance conversion process on image data on the basis of the calculated luminance component and the generated chromaticity component of the perception reference white information,
   wherein the image data is color appearance converted into image data which depends on the observation light source, on the basis of the information regarding the observation light source.

6. An image processing method, comprising the steps of:
   inputting information regarding an observation light source;
   calculating a luminance component of perception reference white information on the basis of the information regarding the observation light source;
   calculating a chromaticity component of the perception reference white information based on white information of a display and the information regarding the observation light source, by using a color adaptation ratio according to the information regarding the observation light source;
   performing a color appearance conversion process on image data on the basis of the calculated luminance component and the calculated chromaticity component of the perception reference white information;
   converting input image data on the basis of profile data of a source device; and
   converting the image data subjected to the color appearance conversion process, into output image data by using profile data of a destination device.

7. An image processing method, comprising the steps of:
   inputting information regarding an observation light source;
   calculating a luminance component of perception reference white information on the basis of the information regarding the observation light source;

calculating a chromaticity component of the perception reference white information based on white information of a display and the information regarding the observation light source, by using a color adaptation ratio according to the information regarding the observation light source;

performing a color appearance conversion process on image data on the basis of the calculated luminance component and the calculated chromaticity component of the perception reference white information;

converting input image data on the basis of profile data of a source device; and converting the image data subjected to the color appearance conversion process, into output image data by using profile data of a destination device, wherein the destination device is the display, and the white information of the display is included in the profile data of the destination device.

* * * * *

UNITED STATES PATENT AND TRADEMARK OFFICE
CERTIFICATE OF CORRECTION

PATENT NO.   : 6,344,900 B1
DATED        : February 5, 2002
INVENTOR(S)  : Yumiko Hidaka It is certified that error appears in the above-identified patent and that said Letters Patent is hereby corrected as shown below:

<u>Title page,</u>
Item [56], References Cited, under FOREIGN PATENT DOCUMENTS:
"07258631 A" should read -- 7-258631 A --.

<u>Column 1,</u>
Line 34, "th" should read -- the --; and
Line 61, "very" should read -- much --.

<u>Column 5,</u>
Line 11, "Y·u'V'Y." should read -- Y·u'v'Y. --.

<u>Column 8,</u>
Line 11, "0.220)/$Y_2$" should read -- 0.220)/$y_2$ --.

<u>Column 12,</u>
Line 63, "equation (13)" should read -- equation (13). --.

<u>Column 15,</u>
Line 2, "made" should read -- made to --.

<u>Column 17,</u>
Line 14, "stored constructs" should read -- stored, constructs --; and
Line 35, "processes" should read -- processes, --.

Signed and Sealed this

Twenty-fourth Day of September, 2002

Attest:

JAMES E. ROGAN
*Attesting Officer*    *Director of the United States Patent and Trademark Office*